United States Patent
Chen et al.

(10) Patent No.: US 7,894,214 B1
(45) Date of Patent: Feb. 22, 2011

(54) POWER CONVERTER CAPABLE OF LOWERING POWER WASTAGE ON STANDBY

(75) Inventors: Lien-Hsing Chen, Taichung County (TW); Li-Hao Liu, Taichung (TW)

(73) Assignee: Power Mate Technology Co., Ltd., Taichung (TW)

( * ) Notice: Subject to any disclaimer, the term of this patent is extended or adjusted under 35 U.S.C. 154(b) by 3 days.

(21) Appl. No.: 12/588,183

(22) Filed: Oct. 7, 2009

(30) Foreign Application Priority Data

Aug. 24, 2009 (TW) ............................. 98215626 U

(51) Int. Cl.
*H02M 3/335* (2006.01)
(52) U.S. Cl. ............... 363/21.05; 363/21.06; 363/21.08
(58) Field of Classification Search ............... 363/21.06, 363/21.05, 21.08
See application file for complete search history.

(56) References Cited

U.S. PATENT DOCUMENTS

| 7,443,146 B2 | 10/2008 | Wei et al. | |
| 7,480,158 B2 * | 1/2009 | Moromizato et al. | 363/21.06 |
| 7,630,217 B2 * | 12/2009 | Moromizato | 363/21.06 |

* cited by examiner

*Primary Examiner*—Shawn Riley
(74) *Attorney, Agent, or Firm*—Bacon & Thomas, PLLC

(57) ABSTRACT

A power converter includes at least one electric control switch, an electric current detecting and converting unit, a power controller, and a voltage detecting and controlling unit at the primary side; and a synchronous rectifying circuit, two MOSFETs, and an oscillating loop. During the actual operation, electric current detecting and converting unit outputs an AC voltage signal to the power controller and outputs a DC voltage signal to the voltage detecting and controlling unit, and then voltage detecting and controlling unit compares with a reference voltage to turn off the synchronous rectifying circuit at the no-load mode and to rectify via a body diodes of the MOSFETs. Accordingly, the power converter can reduce the power wastage at the no-load mode to be energy-saving.

10 Claims, 4 Drawing Sheets

POWER CONVERTER CAPABLE OF LOWERING POWER WASTAGE ON STANDBY

BACKGROUND OF THE INVENTION

1. Field of the Invention

The present invention relates generally to power conversion, and more particularly, to a power converter capable of lowering power wastage on standby.

2. Description of the Related Art

When a conventional DC/DC converter is in the process of power conversion, there will be some power wastage and such power wastage lowers the efficiency of the conversion.

The requirement for the power density of the DC/DC converter is increasing as time passes by. To increase the efficiency of the conversion, in general, a power metal oxide semiconductor field effect transistors (MOSFET) is applied to the second side of the transformer to serve as a synchronous rectifying switch element. Although such manner can indeed heighten the efficiency on heavy load, the power wastage is increased when the converter is driven, such that the power wastage is still generated, when no load happens, to incur lower efficiency.

For example, U.S. Pat. No. 7,443,146 disclosed that the MOSFET is applied to the secondary side for rectification, having the aforesaid drawback, i.e. the power will still be wasted when no load happens.

SUMMARY OF THE INVENTION

The primary objective of the present invention is to provide a power converter, which can lower the power wastage at no-load mode to be energy-saving.

The foregoing objective of the present invention is attained by the power converter composed of a DC power source and at least one transformer. The DC power source includes a positive electrode and a negative electrode. The transformer includes a primary side and a secondary side.

The primary side has one end connected with the positive electrode of the DC power source, having at least one electric control switch, an electric current detecting and converting unit, a power controller, and a voltage detecting and controlling unit. The electric control switch includes a control end and connected with the other end of the primary side. The electric current detecting and converting unit is connected with the electric control switch and the negative electrode of the DC power source for detecting and converting the electric current transmitted through the electric control switch from the primary side and converted into an AC voltage signal and a DC voltage signal for output an AC signal end and a DC signal end. The power controller is connected with the AC signal end and the control end of the electric control switch. The voltage detecting and controlling unit is connected with the DC signal end for detecting the voltage at the DC signal end, having a voltage output end.

The secondary side includes a synchronous rectifying circuit having a voltage control end connected with the voltage output end; two MOSFETs connected with the synchronous circuit and each having a body diode; an oscillating loop having two ends, one of which is grounded and the other end is connected with one end of the secondary side, for connection with a load, having a feedback end connected with the power controller.

In light of the above circuitry, particularly the electric current detecting and converting unit and the voltage detecting and controlling unit, the power wastage can be lowered, when no load happens, to save the energy.

DETAILED DESCRIPTION OF PREFERRED EMBODIMENTS

Figure 1:
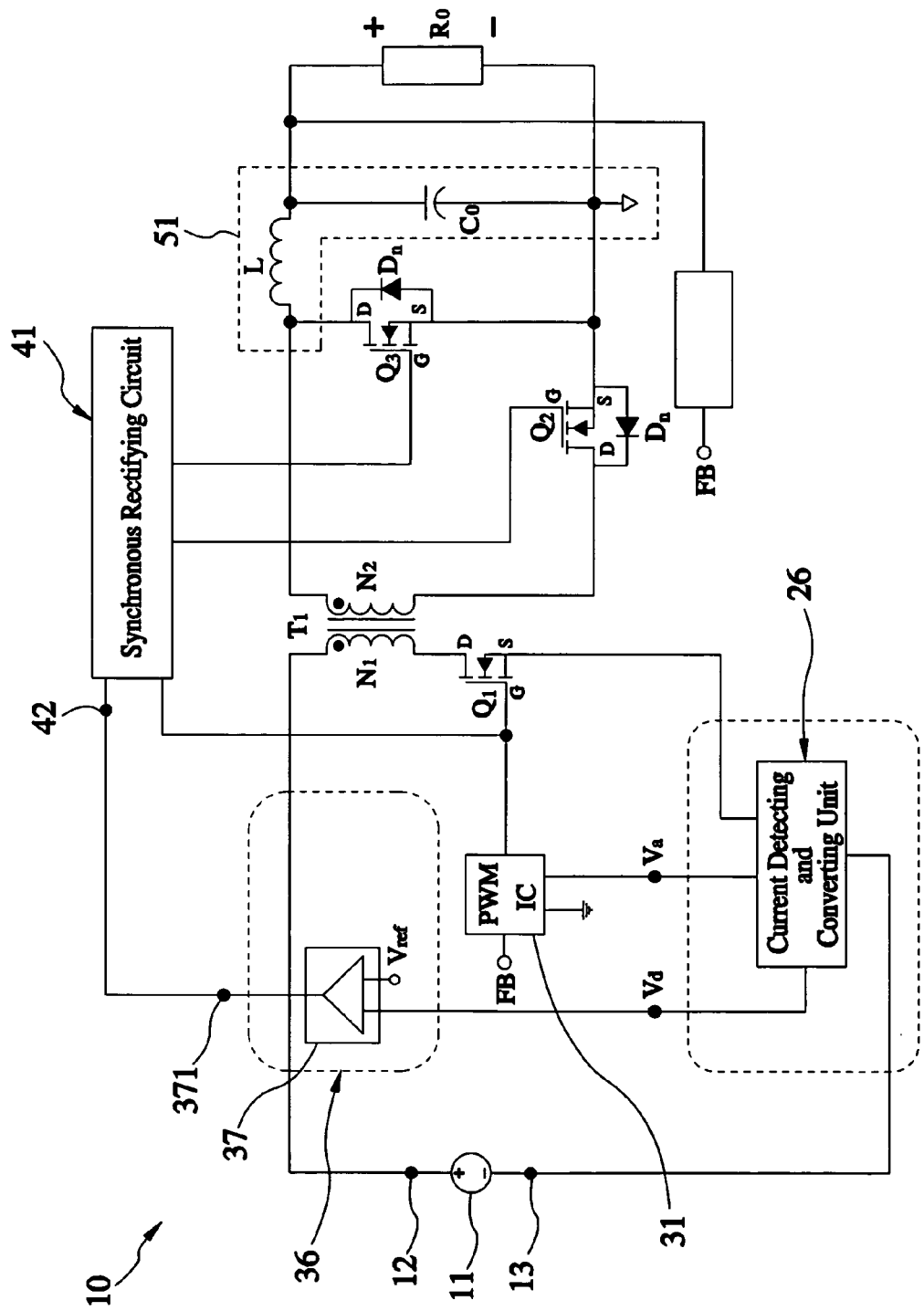
FIG. 1 is a schematic circuit diagram of a first preferred embodiment of the present invention.
Figure 2:
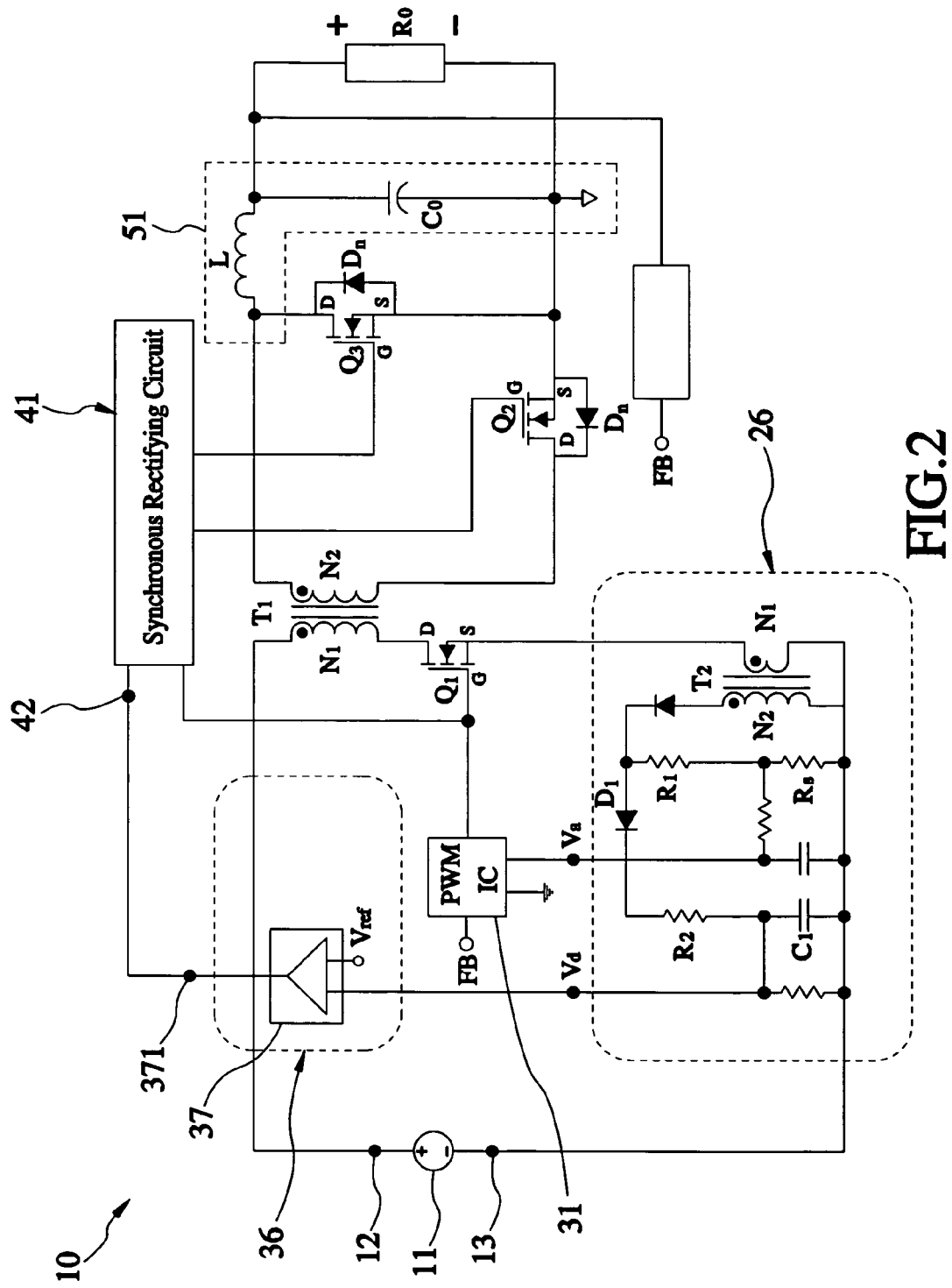
FIG. 2 is a circuit diagram of the first preferred embodiment of the present invention.

Referring to FIGS. 1-2, a power converter 10 capable of lowering power wastage on standby in accordance with a first preferred embodiment of the present invention is composed of a DC power source 11, a first transformer $T_1$, a first electric control switch $Q_1$, an electric current detecting and converting unit 26, a power controller 31, a voltage detecting and controlling unit 36, a synchronous rectifying circuit 41, two MOSFETs $Q_2$ and $Q_3$, and an oscillating loop 51.

The DC power source 11 includes a positive electrode 12 and a negative electrode 13.

The first transformer $T_1$ includes a primary side $N_1$ and a secondary side $N_2$.

The primary side $N_1$ has one end connected with the positive electrode 12. The first electric control switch $Q_1$, the electric current detecting and converting unit 26, the power controller 31, and the voltage detecting and controlling unit 36 are located at the primary side $N_1$.

The first electric control switch $Q_1$ includes a control end G connected with the other end of the primary side $N_1$. The first electric control switch $Q_1$ is an MOSFET whose control end is a gate G and whose drain D is connected with the primary side $N_1$, whose source S is connected with the electric current detecting and converting unit 26.

The electric current detecting and converting unit 26 includes a second transformer $T_2$ and two voltage division resistors $R_1$ and $R_s$. The second transformer $T_2$ has a primary side $N_1$ having two ends, one of which is connected with the first electric control switch $Q_1$ and the other end is connected with the negative electrode 13 of the DC power source 11. The two voltage division resistors $R_1$ and $R_s$ are connected in series and then connected with a secondary side $N_2$ of the second transformer $T_2$. The second transformer $T_2$ further includes at the secondary side $N_2$ a diode $D_1$, a resistor $R_2$, and a capacitor $C_1$, which are connected with one another in series. The electric current detecting and converting unit 26 can detect a power source transmitted through the first electric control switch $Q_1$ from the primary side $N_1$ of the first transformer $T_1$ and then converted into an AC voltage signal and a DC voltage signal for output via an AC signal end $V_a$ and a DC signal end $V_d$. A node connected between the two voltage division resistors $R_1$ and $R_s$ is the AC signal end $V_a$ and a node connected between the resistor $R_2$ and the capacitor $C_1$ is the DC signal end $V_d$.

The power controller 31 is a power width modulator (PWM) control IC and connected with the AC signal end $V_a$ and the control end G of the first electric control switch $Q_1$.

The voltage detecting and controlling unit 36 includes a comparator 37 connected with the DC signal end $V_d$ and having a reference voltage end $V_{ref}$ connected with a reference voltage. The comparator 37 has an output end defined as a voltage output end 371. The voltage detecting and controlling unit 36 can detect the voltage of the DC signal end $V_d$.

The secondary side $N_2$ of the first transformer $T_1$ includes the synchronous rectifying circuit 41, the two MOSFETs $Q_2$ and $Q_3$, and the oscillating loop 51.

The synchronous rectifying circuit 41 includes a voltage control end 42 connected with the voltage output end 371 and is connected with the power controller 31.

The two MOSFETs $Q_2$ and $Q_3$ are grounded and each includes a source S connected with the other, a gate G connected with the synchronous rectifying circuit 41, a drain D connected with one of two ends of the secondary side $N_2$, and a body diode $D_n$.

The oscillating loop 51 includes two ends, one of which is grounded and the other end is connected with one end of the secondary side $N_2$, for connection with a load $R_0$. The oscillating loop 51 includes a feedback end FB connected with the power controller 31. The oscillating loop 51 is composed of an inductor L and a capacitor $C_0$ connected with inductor L in series where a node is the feedback end FB. The load $R_0$ is connected with the capacitor $C_0$ in parallel.

The operation manner of the first embodiment of the present invention for the primary side $N_1$ is recited below.

The power controller 31 can control the first electric control switch $Q_1$ for electric conduction and meanwhile, the power source of the primary side $N_1$ of the first transformer $T_1$ enters the primary side $N_1$ of the second transformer $N_2$ of the electric current detecting and converting unit 26, and then be generated at the secondary side $N_2$ of the second transformer $N_2$ after transformation, finally outputting an AC voltage signal to the power controller 31 via the AC signal end $V_a$ and rectified via the diode $D_1$ to output a DC voltage signal to the comparator 37 via the DC signal end $V_d$.

When a normal rectification task or a heavy-load mode proceeds, the voltage of the DC voltage signal at the DC signal end $V_d$ is higher than the reference voltage of the reference voltage end $V_{ref}$, so the synchronous rectifying circuit 41 drives the two MOSFETs $Q_2$ and $Q_3$ to work.

When the no-load mode proceeds and the voltage of the DC voltage signal at the DC signal end $V_d$ drops to be lower than the reference voltage of the reference voltage end $V_{ref}$, the potential of the voltage output end 371 of the comparator 37 is low to turn off the synchronous rectifying circuit 41 and then the MOSFETs $Q_2$ and $Q_3$ are also turned off; meanwhile, the rectification continues to proceed via the body diode $D_n$ instead. Because it is not necessary to drive the MOSFETs $Q_2$ and $Q_3$ in the meantime, none of any energy generated while the MOSFETs $Q_2$ and $Q_3$ is driven is wasted to reduce the power wastage at the no-load mode.

Tables 1 illustrates that a circuit without the electric current detecting and converting unit 26 and the voltage detecting and controlling unit 36 still drives the MOSFETs $Q_2$ and Q for rectification at the no-load mode. When the input voltage is $36V_{in}$, the power wastage remains 5.904 W. Table 2 illustrates that a circuit to which the electric current detecting and converting unit 26 and the voltage detecting and controlling unit 36 are applied works to rectify via the body diode $D_n$. When the input voltage is $36V_{in}$, the power wastage plummets down to 0.864 W. Therefore, the wastage of the energy is greatly decreased.

TABLE 1

|  | 5% Efficiency on Load | 10% Efficiency on Load | Current on No Load | Waste on No Load |
|---|---|---|---|---|
| 18 Vin | 61.4% | 91.8% | 182 mA | 3.276 W |
| 24 Vin | 56.8% | 92.1% | 164 mA | 3.936 W |
| 36 Vin | 46.8% | 91.5% | 164 mA | 5.904 W |

TABLE 2

|  | 5% Efficiency on Load | 10% Efficiency on Load | Current on No Load | Waste on No Load |
|---|---|---|---|---|
| 18 Vin | 66.0% | 91.7% | 28 mA | 0.504 W |
| 24 Vin | 65.3% | 92.1% | 28 mA | 0.672 W |
| 36 Vin | 60.7% | 91.4% | 24 mA | 0.864 W |

Figure 3:
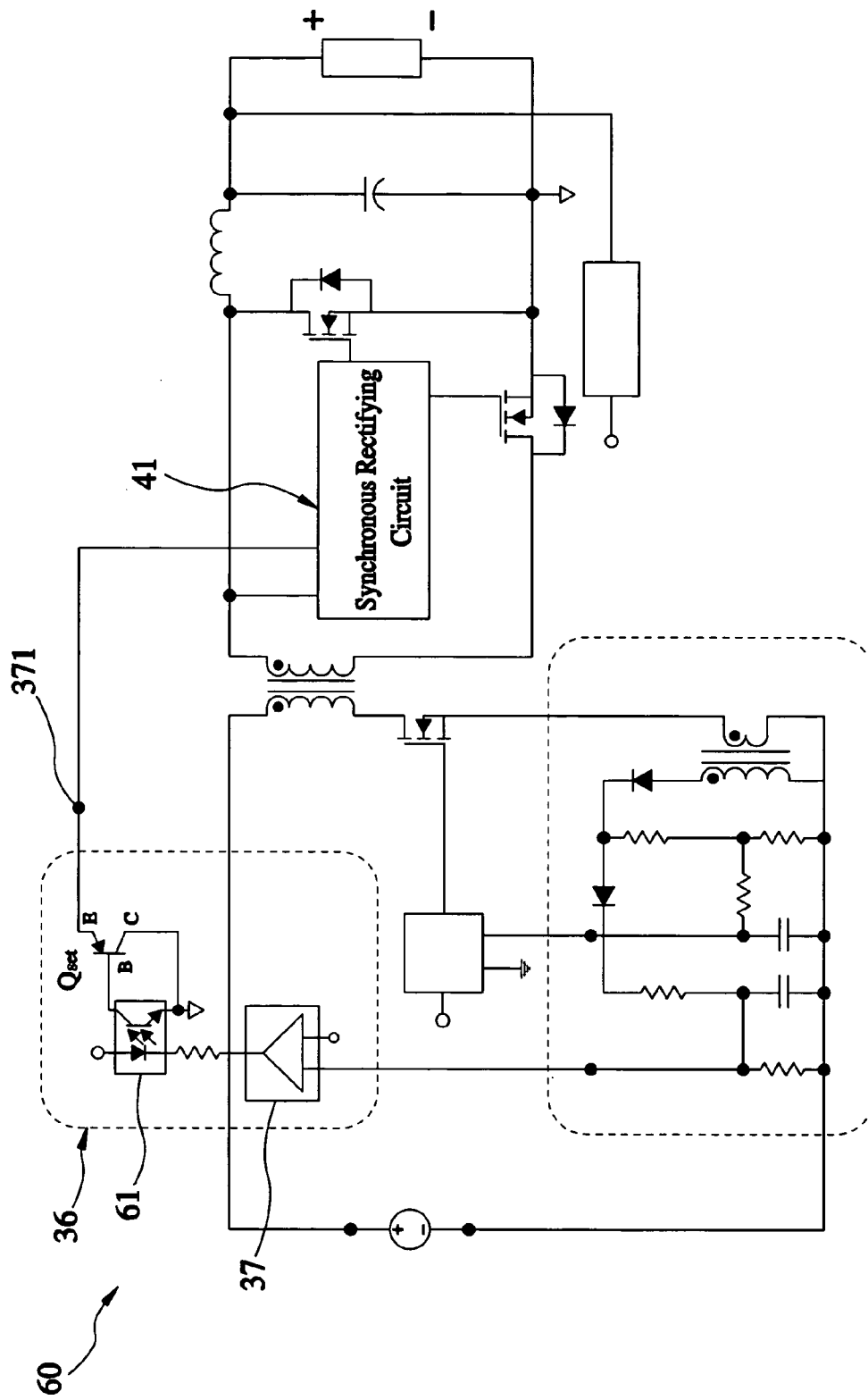
FIG. 3 is a circuit diagram of a second preferred embodiment of the present invention.

Referring to FIG. 3, a power converter 60 capable of lowering power wastage on standby in accordance with a second preferred embodiment of the present invention is similar to that of the first embodiment of the present invention, having the difference as recited below.

In addition to the comparator 37, the voltage detecting and controlling unit 36 also includes a photo-coupled switch 61 and a second electric control switch $Q_{set}$, which is a transistor in this embodiment. The output end of the comparator 37 is connected with the photo-coupled switch 61. The second electric control switch $Q_{set}$ includes a control end B connected with the photo-coupled switch 61, having two connection ends E and C defined as the voltage output end 371 and grounded respectively. In the second embodiment of the present invention, the photo-coupled switch 61 and the second electric control switch $Q_{set}$ can serve as an independent signal control protocol to provide stabler signals for the synchronous rectifying circuit 41. Since the other structures and working manners of the second embodiment are identical those of the first embodiment, no more description is necessary.

Figure 4:
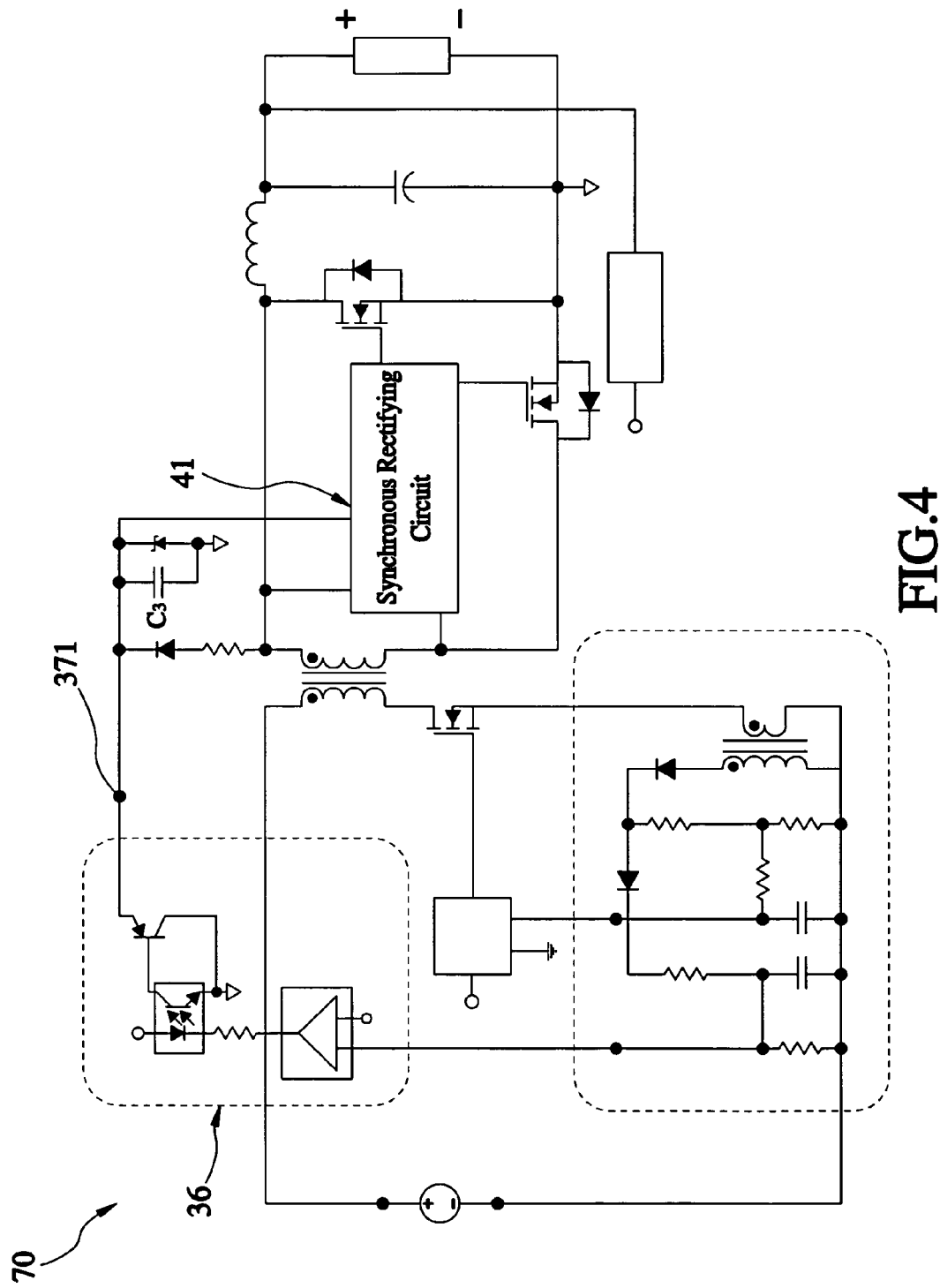
FIG. 4 is a circuit diagram of a third preferred embodiment of the present invention.

Referring to FIG. 4, a power converter 70 capable of lowering power wastage on standby in accordance with a third preferred embodiment of the present invention is similar to that of the second embodiment of the present invention, having the difference as recited below.

The power converter 70 further includes a stable capacitor $C_3$ having two ends connected with the voltage output end 371 for stabilizing the voltage of signals outputted from the voltage output end 371, such that the control over the synchronous rectifying circuit 41 is preferably stable. Since the other structures and working manners of the third embodiment are identical those of the second embodiment, no more description is necessary.

In conclusion, the present invention can decrease the power wastage of the power converter at the no-load mode to save the energy.

Although the present invention has been described with respect to specific preferred embodiments thereof, it is in no way to limit the specifics of the illustrated structures but changes and modifications may be made within the scope of the appended claims.

What is claimed is:

1. A power converter capable of lowering power wastage on standby, comprising:
   a DC power source having a positive electrode and a negative electrode; and a first transformer having a primary side and a secondary side, the primary side having an end connected the positive electrode, the primary side having:
  a first electric control switch having a control end and connected with the other end of the primary side;
  an electric current detecting and converting unit connected with the first electric control switch and the negative electrode of the DC power source for detecting power source transmitted through the first electric control switch from the primary side and converting it into an AC voltage signal and a DC voltage signal for output via an AC signal end and a DC signal end respectively;
  a power controller connected with the AC signal end and the control end of the first electric control switch; and
  a voltage detecting and controlling unit having a voltage output end and connected with the DC signal end for detecting voltage at the DC signal end;
the secondary side of the first transformer having:
  a synchronous rectifying circuit having a voltage control end connected with the voltage output end;
  an MOSFET connected with the synchronous rectifying circuit and each having a body diode; and
  an oscillating loop having two ends, one of which is grounded and the other end is connected with an end of the secondary side, for connection with a load, the oscillating loop having a feedback end connected with the power controller.

2. The power converter as defined in claim 1, wherein each of the MOSFETs is grounded and comprises a source connected with the other, a gate connected with the synchronous rectifying circuit, and a drain connected with one of two ends of the secondary side.

3. The power converter as defined in claim 1, wherein the first electric control switch is an MOSFET comprising a gate at its control end, a drain connected with the primary side, and a source connected with the electric current detecting and converting unit.

4. The power converter as defined in claim 1, wherein the power controller is a PWM control IC.

5. The power converter as defined in claim 1, wherein the oscillating loop is composed of an inductor and a capacitor; the load is connected with the capacitor in parallel; the feedback end is a node where the inductor and the capacitor are connected.

6. The power converter as defined in claim 1, wherein the electric current detecting and converting unit comprises a second transformer and two voltage division resistors, the second transformer having a primary side having two ends, one of which is connected with the first electric control switch and the other end is connected with the negative electrode of the DC power source, the two voltage division resistors being connected in series and then connected with the secondary side of the second transformer in parallel; the AC signal end is a node where the two voltage division resistors are connected, the secondary side of the second transformer having a diode, a resistor, and a capacitor, which are connected in series; the DC signal end is a node where the resistor and the capacitor are connected.

7. The power converter as defined in claim 1, wherein the voltage detecting and controlling unit comprises a comparator and a reference voltage end, the comparator being connected with the DC signal end, the reference voltage end being connected with a reference voltage; the voltage output end is defined as an output end of the comparator; the synchronous rectifying circuit is connected with the power controller.

8. The power converter as defined in claim 1, wherein the voltage detecting and controlling unit comprises a comparator, a photo-coupled switch, and a second electric control unit, the comparator being connected with the DC signal end and having a reference voltage end connected with a reference voltage, the photo-coupled switch being connected with an output end of the comparator, the second electric control switch having a control end connected with the photo-coupled switch, the second electric control switch having two connection ends serving as the voltage output end and grounded respectively.

9. The power converter as defined in claim 8, wherein the second electric control switch of the voltage detecting and controlling unit is a transistor.

10. The power converter as defined in claim 8 further comprising a stable capacitor, wherein the stable capacitor has two ends, one of which is connected with the voltage output end and the other end is grounded.

* * * * *